UNITED STATES PATENT OFFICE 1,921,587

METHOD FOR THE MANUFACTURE OF SECONDARY AROMATIC AMINES

Waldo L. Semon and Paul C. Jones, Cuyahoga Falls, Ohio, assignors to The B. F. Goodrich Company, New York, N. Y., a Corporation of New York No Drawing. Application June 13, 1928
Serial No. 285,210

15 Claims. (Cl. 260—128)

This invention relates to the manufacture of secondary aromatic amines, and has as its object to provide a readily controlled, generally applicable method for the manufacture of secondary aromatic amines in a high yield and of a high purity, either in the laboratory or on a commercial scale.

It is known that primary aromatic amines react with aryl hydroxy compounds, known generically as phenols, to form secondary amines and water according to the general equation:

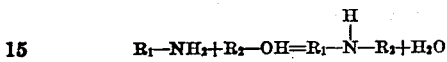

This reaction, however, is very slow, requires a high temperature, does not go to completion, and is accompanied by side-reactions giving rise to tertiary amines and other unwanted products. If the amine hydrochloride, or a similar salt of a volatile acid with the amine, is substituted for the amine, the temperature required for the reaction is somewhat lower. However, in this case the acid is eliminated with the water during the reaction, which necessitates the use of acid-proof apparatus throughout. The reaction has also been carried out in the presence of a dehydrating agent such as calcium chloride or zinc chloride, but the product is not pure, and, unless a large excess of one of the reacting materials is used, the yield is low. Iodine has been used to catalyze the reaction, but, unless special apparatus is installed for its recovery, it is too expensive for commercial use.

We have found that the reaction time is decreased and the yield of pure product considerably increased by adding to the mixture of primary amine and phenol a small proportion of strong acid as a catalyst. For example, hydrochloric, sulphuric, phenol-sulphonic or other strong acid may be added, preferably in an amount of from 0.1% to 5.0% of the total weight of the mixture of primary amine and phenol. However, small proportions of acid may sometimes be effective, while in other cases 10% or more may be required. We have also found that the purity of the product may be further increased by removing by distillation, continuously or periodically, the water that is formed during the reaction.

The beneficial effects of removing the water become more evident from a consideration of the equilibrium conditions in the reaction of the specific materials, aniline and beta-naphthol, to form phenyl-beta-naphthylamine and water.

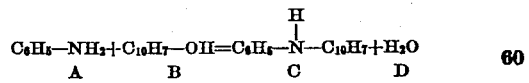

The equilibrium among the four materials A, B, C, and D, may be represented by the equation:

$$\frac{(C)(D)}{(A)(B)} = K; \text{ or } (C) = \frac{K(A)(B)}{(D)}$$

the letters enclosed in brackets representing the concentrations of the corresponding materials in the reaction mixture in moles per liter, and K being a constant having a value in this case of about 30. In order that the concentration of C in the final mixture be as high as possible, the concentration of D should be very low. This result may be accomplished by leaving the system open and allowing the water to boil out of the mixture. If, as in this case, one or both of the reacting materials is volatile, losses may be prevented by allowing the vapors to escape through a condenser which will return to the system the volatile reacting material, but not the water, or by closing the system and blowing off the water vapor periodically as the pressure increases. The proportions of the reacting materials should then be so balanced that no great excess of either material is present in the final product.

Example 1.—For example, to manufacture phenyl-beta-naphthylamine on a commercial scale by this process place 360 lbs. of beta-naphthol (1 molecular equivalent), 244 lbs. aniline (1.05 molecular equivalent), and 2.5 lbs. of sulphuric acid (0.02 molecular equivalents) in a kettle equipped with a reflux condenser which will condense aniline vapor but not water vapor. Heat the mixture so that it is maintained at a temperature of 200–220° C. for two hours. Draw off the product, consisting of 95% to 98% pure phenyl-beta-naphthylamine, while it is still hot.

Example 2.—As another example of the manufacture of phenyl-beta-naphthylamine by this method, place the following materials in an autoclave in the order named:

|  | Lbs. |
|---|---|
| Beta-naphthol (1 molecular equivalent) | 575 |
| Aniline (1.1 molecular equivalent) | 410 |
| Sulfuric acid (0.02 molecular equivalent) | 4 |

Close the autoclave and heat it for two hours at a temperature of 200–220° C. At the expiration of each half hour allow the mixed aniline and water vapor to blow off through a condenser, where the aniline may be recovered. Finally instead of blowing off the vapor at the top of the autoclave, open a valve in the bottom and blow the product into a discharge tank, whence it may be drawn into cans and allowed to solidify.

The excess of aniline in these examples is such as to compensate nearly exactly for the amount which distills off with the water vapor. The small amount of acid which remains in the product in a combined form does not affect the usefulness of the product for many purposes. The yield of phenyl-beta-naphthylamine made by the specific methods illustrated in the examples is in the neighborhood of 98% of the theoretical yield calculated from the beta-nahpthol and when the process is carefully controlled, the crude product can be made 97% pure.

Other proportions of the reacting materials than those specifically mentioned may be used, and other strong acids may be employed as catalysts. The reaction is a general one and may be employed for the manufacture of various secondary aromatic amines by the substitution of the appropriate primary amine and phenol and the proper change in the time and in the temperature and pressure at which the reaction is allowed to proceed. For example: aniline and p,p'dihydroxy-diphenylamine form p-phenylamino-p'-hydroxy-diphenylamine or p,p'di(phenylamino)-diphenylamine, toluidine and beta-naphthol form tolyl-beta-naphthylamine, alpha-naphthylamine and beta-naphthol form alpha-beta-dinaphthylamine, p-phenylene diamine and beta-naphthol form mono- or di-beta-naphthyl-p-phenylene-diamine, p-toluylene-diamine and alpha-naphthol form mono- or di-alpha-naphthyl-p-toluylene-diamine, p-amino-diphenylamine and beta-naphthol form phenyl-beta-naphthyl-p-phenylene-diamine, benzidine and beta-naphthol form mono- or di-beta-naphthyl-benzidine, phenol and aniline form diphenylamine, and cresols with aniline form tolyl-phenylamine.

Furthermore, hydroquinone, resorcinol, catechol, pyrogallol, dihydroxy naphthaline or other polyhydroxy aromatic hydrocarbons react with aniline, p-toluidine, p-phenylene-diamine, or alpha-naphthylamine to form the corresponding secondary amines.

Obviously, the conditions of the reaction may be varied between wide limits, and other substances and combinations of substances than those specifically cited as examples may be used, without departing from the spirit of the invention. We wish, therefore, not to limit this invention except as set forth in the claims.

We claim:

1. The method of manufacturing secondary aromatic amines which comprises reacting a mixture of a primary aromatic amine and a phenol in the presence of a small proportion of a strong acid as a catalyst.

2. The method of manufacturing secondary aromatic amines which comprises adding a small proportion of a strong acid as a catalyst to a mixture of a primary aromatic amine and a phenol and heating the mixture to a reacting temperature.

3. The method of manufacturing secondary aromatic amines which comprises adding a small proportion of a strong acid as a catalyst to a mixture of a primary aromatic amine and a phenol to promote the reaction according to the general equation:

$$R_1-NH_2+R_2-OH=R_1-\overset{H}{\underset{|}{N}}-R_2+H_2O$$

where $R_1$ and $R_2$ are like or unlike aryl groups, heating the mixture to a temperature at which water is formed, and eliminating the greater part of the water by distillation during the course of the reaction.

4. The method of manufacturing secondary aromatic amines which comprises adding approximately two hundredths of a molecular equivalent of a strong acid as a catalyst to a mixture of a primary aromatic amine and a phenol in substantially molecular equivalent proportions, to promote the reaction according to the general equation:

$$R_1-NH_2+R_2-OH=R_1-\overset{H}{\underset{|}{N}}-R_2+H_2O$$

where $R_1$ and $R_2$ are like or unlike aryl groups, heating the mixture to a temperature at which water is formed, and eliminating the greater part of the water by distillation during the course of the reaction.

5. The method of manufacturing secondary aromatic amines which comprises adding approximately two hundredths of a molecular equivalent of a strong acid as a catalyst to a mixture of a primary aromatic amine and a phenol containing at least two aromatic rings, to promote the reaction according to the general equation:

$$R_1-NH_2+R_2-OH=R_1-\overset{H}{\underset{|}{N}}-R_2+H_2O$$

where $R_1$ is an aryl group and $R_2$ is an aryl group containing two aromatic rings, heating the mixture to a temperature at which water is formed, and eliminating the greater part of the water by distillation during the course of the reaction.

6. The method of manufacturing a secondary naphthyl amine which comprises adding a small proportion of a strong acid as a catalyst to a mixture of a primary aromatic amine and a naphthol in substantially molecular equivalent proportions, to promote the reaction according to the general equation:

$$R-NH_2+C_{10}H_7-OH=R-\overset{H}{\underset{|}{N}}-C_{10}H_7+H_2O$$

where R is an aryl group, heating the mixture to a temperature at which water is formed, and eliminating the greater part of the water by distillation during the course of the reaction.

7. The method of manufacturing a secondary beta-naphthyl amine which comprises adding a small proportion of a strong acid as a catalyst to a mixture of a primary aromatic amine and beta-naphthol in substantially molecular equivalent proportion, to promote the reaction according to the general equation.

$$R-NH_2+C_{10}H_7-OH=R-\overset{H}{\underset{|}{N}}-C_{10}H_7+H_2O$$

where R is an aryl group, heating the mixture to a temperature at which water is formed and eliminating the greater part of the water by distillation during the course of the reaction.

8. The method of manufacturing phenyl-beta-naphthylamine which comprises adding a small proportion of a strong acid as a catalyst to a mixture of aniline and beta-naphthol to promote the reaction according to the general equation:

$$C_6H_5-NH_2+C_{10}H_7-OH=C_6H_5-\overset{H}{\underset{|}{N}}-C_{10}H_7+H_2O$$

heating the mixture to a temperature at which water is formed, and eliminating the greater part of the water by distillation during the course of the reaction.

9. The method of manufacturing phenyl-beta-naphthylamine which comprises adding approximately two hundredths of a molecular equivalent of a strong acid as a catalyst to a mixture of aniline and beta-naphthol to promote the reaction according to the general equation:

$$C_6H_5-NH_2 + C_{10}H_7-OH = C_6H_5-\overset{H}{\underset{|}{N}}-C_{10}H_7 + H_2O$$

heating the mixture to a temperature above 200° C., and eliminating the greater part of the water by distillation during the course of the reaction.

10. The hereinabove described methods of manufacturing phenyl-beta-naphthylamine which comprise adding a small proportion of sulphuric acid as a catalyst to a mixture of aniline and beta-naphthol and heating the mixture.

11. The hereinabove described method of manufacturing phenyl-beta-naphthylamine which comprises adding a small proportion of sulphuric acid as a catalyst to a mixture of aniline and beta-naphthol and heating the mixture at atmospheric pressure.

12. The method of manufacturing dinaphthyl benzidine which comprises adding a small proportion of a strong acid as a catalyst to a mixture of naphthol and benzidine, and heating the mixture to a reacting temperature.

13. The method of manufacturing beta dinaphthyl benzidine which comprises adding a small proportion of a strong acid as a catalyst to a mixture of beta naphthol and benzidine in approximately reacting proportions, heating the mixture to a temperature at which water is formed, and eliminating the greater part of the water by distillation during the course of the reaction.

14. The method of manufacturing secondary aromatic amines which comprises adding a small proportion of a strong acid as a catalyst to a mixture of hydroquinone and a primary aromatic amine, and heating the mixture to a reacting temperature.

15. The method of manufacturing diphenyl p-phenylene diamine which comprises adding a small proportion of a strong acid as a catalyst to a mixture of hydroquinone with sufficient aniline to react completely therewith, heating the mixture to a temperature at which water is formed, and eliminating the greater part of the water by distillation during the course of the reaction.

WALDO L. SEMON.
PAUL C. JONES.